US007707528B1

(12) United States Patent
White et al.

(10) Patent No.: US 7,707,528 B1
(45) Date of Patent: Apr. 27, 2010

(54) SYSTEM AND METHOD FOR PERFORMING VERIFICATION BASED UPON BOTH RULES AND MODELS

(75) Inventors: David White, San Jose, CA (US); Roland Ruehl, San Carlos, CA (US); Mathew Koshy, San Mateo, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 75 days.

(21) Appl. No.: 11/678,592

(22) Filed: Feb. 24, 2007

(51) Int. Cl.
*G06F 17/50* (2006.01)

(52) U.S. Cl. ............................................. 716/5; 716/4

(58) Field of Classification Search ....................... None
See application file for complete search history.

(56) References Cited

U.S. PATENT DOCUMENTS 5,335,191 A 8/1994 Kundert et al.
5,559,718 A * 9/1996 Baisuck et al. ................. 716/5
5,654,898 A 8/1997 Roetcisoender et al.
5,729,466 A 3/1998 Bamji
5,862,055 A 1/1999 Chen et al.
5,966,459 A 10/1999 Chen et al.
6,035,244 A 3/2000 Chen et al.
6,066,179 A 5/2000 Allan
6,088,523 A 7/2000 Nabors et al.
6,151,698 A 11/2000 Telichevesky et al.
6,393,602 B1 5/2002 Atchison et al.
6,470,489 B1 * 10/2002 Chang et al. .................. 716/21
6,493,849 B1 12/2002 Telichevesky et al.
6,636,839 B1 10/2003 Telechevesky et al.
6,751,785 B1 * 6/2004 Oh ............................. 716/10
6,904,581 B1 * 6/2005 Oh ............................. 716/10
6,921,672 B2 7/2005 Satya et al.
6,996,797 B1 * 2/2006 Liebmann et al. ............. 716/19
7,194,704 B2 * 3/2007 Kotani et al. ................... 716/2
7,308,669 B2 12/2007 Buehler et al.
7,325,206 B2 1/2008 White et al.
7,353,475 B2 4/2008 White et al.
7,356,783 B2 4/2008 Smith et al.
7,360,179 B2 4/2008 Smith et al.
7,363,099 B2 4/2008 Smith et al.
7,363,598 B2 4/2008 Smith et al.
7,367,008 B2 4/2008 White et al.
7,380,220 B2 5/2008 Smith et al.
7,383,521 B2 6/2008 Smith et al.
7,386,815 B2 6/2008 Bickford et al.
7,393,755 B2 7/2008 Smith et al.

(Continued)

OTHER PUBLICATIONS

Barnett et al. "Yield-Reliability Modeling: Experimental Verification and Application to Burn-in Reduction", Proceedings of 20th IEEE VLSI Test Symposium, 2002, pp. 75-80.

(Continued)

*Primary Examiner*—Leigh Marie Garbowski
(74) *Attorney, Agent, or Firm*—Vista IP Law Group LLP

(57) ABSTRACT

Methods and systems for integrating both models and rules into a verification flow to address both of these issues. Models are employed to perform simulations to provide more accurate verification results. In addition, the lithography simulation results can be used to fine-tune the rules themselves to provide a more realistic check upon circuit designs.

23 Claims, 8 Drawing Sheets

U.S. PATENT DOCUMENTS

| | | | | |
|---|---|---|---|---|
| 7,418,694 | B2 | 8/2008 | Kobayashi et al. | |
| 7,453,261 | B1 | 11/2008 | Mark | |
| 7,503,020 | B2 | 3/2009 | Allen et al. | |
| 7,592,827 | B1 | 9/2009 | Brozek | |
| 2005/0037522 | A1 | 2/2005 | Smith et al. | |
| 2005/0051809 | A1 | 3/2005 | Smith et al. | |
| 2005/0196964 | A1 | 9/2005 | Smith et al. | |
| 2005/0235246 | A1 | 10/2005 | Smith et al. | |
| 2005/0251771 | A1* | 11/2005 | Robles | 716/5 |
| 2005/0268256 | A1* | 12/2005 | Tsai et al. | 716/4 |
| 2005/0273739 | A1 | 12/2005 | Tohyama | |
| 2006/0123380 | A1* | 6/2006 | Ikeuchi | 716/21 |
| 2006/0265684 | A1 | 11/2006 | Buehler et al. | |
| 2006/0273266 | A1* | 12/2006 | Preil et al. | 250/548 |
| 2007/0101305 | A1 | 5/2007 | Smith et al. | |
| 2007/0133860 | A1* | 6/2007 | Lin et al. | 382/149 |
| 2007/0256039 | A1 | 11/2007 | White | |
| 2007/0294648 | A1 | 12/2007 | Allen et al. | |
| 2008/0005704 | A1* | 1/2008 | Miloslavsky et al. | 716/2 |
| 2008/0027698 | A1 | 1/2008 | White | |
| 2008/0148201 | A1 | 6/2008 | Lanzerotti et al. | |
| 2008/0160646 | A1 | 7/2008 | White et al. | |
| 2008/0162103 | A1 | 7/2008 | White et al. | |
| 2008/0163139 | A1 | 7/2008 | Scheffer et al. | |
| 2008/0163141 | A1 | 7/2008 | Scheffer et al. | |
| 2008/0163148 | A1 | 7/2008 | Scheffer et al. | |
| 2008/0163150 | A1 | 7/2008 | White | |
| 2008/0189664 | A1 | 8/2008 | Bickford et al. | |
| 2008/0195359 | A1 | 8/2008 | Barker et al. | |
| 2008/0216027 | A1 | 9/2008 | White et al. | |
| 2009/0031261 | A1 | 1/2009 | Smith et al. | |
| 2009/0031271 | A1 | 1/2009 | White et al. | |
| 2009/0100386 | A1 | 4/2009 | Allen | |

OTHER PUBLICATIONS

Wang et al., "Yield Modeling of Arbitrary Defect Outline", 8th International Conference on Solid-State and Integrated Circuit Technology, Oct. 23-26, 2006, pp. 1183-1185.

Wagner et al. "An Interactive Yield Estimator as a VLSI CAD Tool", The IEEE International Workshop on Defect and Fault Tolerance in VLSI Systems, Oct. 27-29, 1993, pp. 167-174.

Segal et al., "Critical Area Based Yield Predicition Using In-Line Defect Classification Information [DRAMs]", 2000 IEEE/SEMI Advanced Semiconductor Manufacturing Conference and Workshop, Sep. 12-14, 2000, pp. 83-88.

Harris et al., "Estimates of Integrated Circuit Yield Components from In-Line Inspection Data and Post-Process Sort Data", IEEE/SEMI Advanced Semiconductor Manufacturing Conference, 1997, pp. 150-155.

Duvivier et al., "Approximation of Critical Area of ICs with Simple Parameter Extracted from the Layout", 1995 IEEE International Conference Workshop on Defect and Fault Tolerance in VLSI Systems, Nov. 13-15, 1995, pp. 1-9.

Non-Final Office Action dated May 12, 2009 for U.S. Appl. No. 11/678,593.

Notice of Allowance dated Jun. 11, 2009 for U.S. Appl. No. 11/678,594.

Notice of Allowance dated Nov. 16, 2009 for U.S. Appl. No. 11/678,593.

Notice of Allowance dated Jan. 8, 2010 for U.S. Appl. No. 11/678,594.

* cited by examiner

SYSTEM AND METHOD FOR PERFORMING VERIFICATION BASED UPON BOTH RULES AND MODELS

RELATED APPLICATION DATA

The present application is related to co-pending U.S. patent application Ser. No. 11/678,593, entitled "System and Method for Model-Based Scoring and Yield Prediction," filed on Feb. 24, 2007, and co-pending U.S. patent application Ser. No. 11/678,594, entitled "System and Method for Layout Optimization Using Model-Based Verification," filed on Feb. 24, 2007, which are hereby incorporated by reference in their entirety.

FIELD OF THE INVENTION

The invention relates to Integrated Circuit (chip) design.

BACKGROUND

Traditionally, verification is performed using only rules-based approaches. For example, design rule check (DRC) is performed by checking the geometric properties of as-designed polygons in the design against a set of rules in a designated rule deck. However, the as-designed features may be significantly different from the as-manufactured features once lithography, etch, chemical mechanical planarization (CMP), and other processes are applied to actually manufacture the product. Therefore, two significant problems with the rules-only approach are (1) since the as-manufactured circuit features may differ from the as-designed circuit features, this causes inaccuracies in the verification results and (2) the rules themselves are determined for the as-designed features, and may therefore be overly-pessimistic or overly-optimistic relative to the as-manufactured features.

SUMMARY

Methods and systems for allowing an Integrated Circuit (IC) designer to verify based on both the design rules and models.

In one implementation, a method for verification describes how the rules are associated to the models. The model-based verification tool provides simulations to predict the manufactured design.

In another implementation, a method for verification is computed in parallel to reduce complexity.

In another implementation, a method for verification is based on customization for certain design types.

In another implementation, a method for connectivity dependence to represent design intent.

DETAILED DESCRIPTION

The invention is directed to a method and system for integrating both models and rules into a verification flow to address both of these issues. Models are employed to perform simulations (e.g., lithography simulation) to provide more accurate verification results. In addition, the lithography simulation results can be used to fine-tune the rules themselves to provide a more realistic check upon circuit designs.

Figure 1:
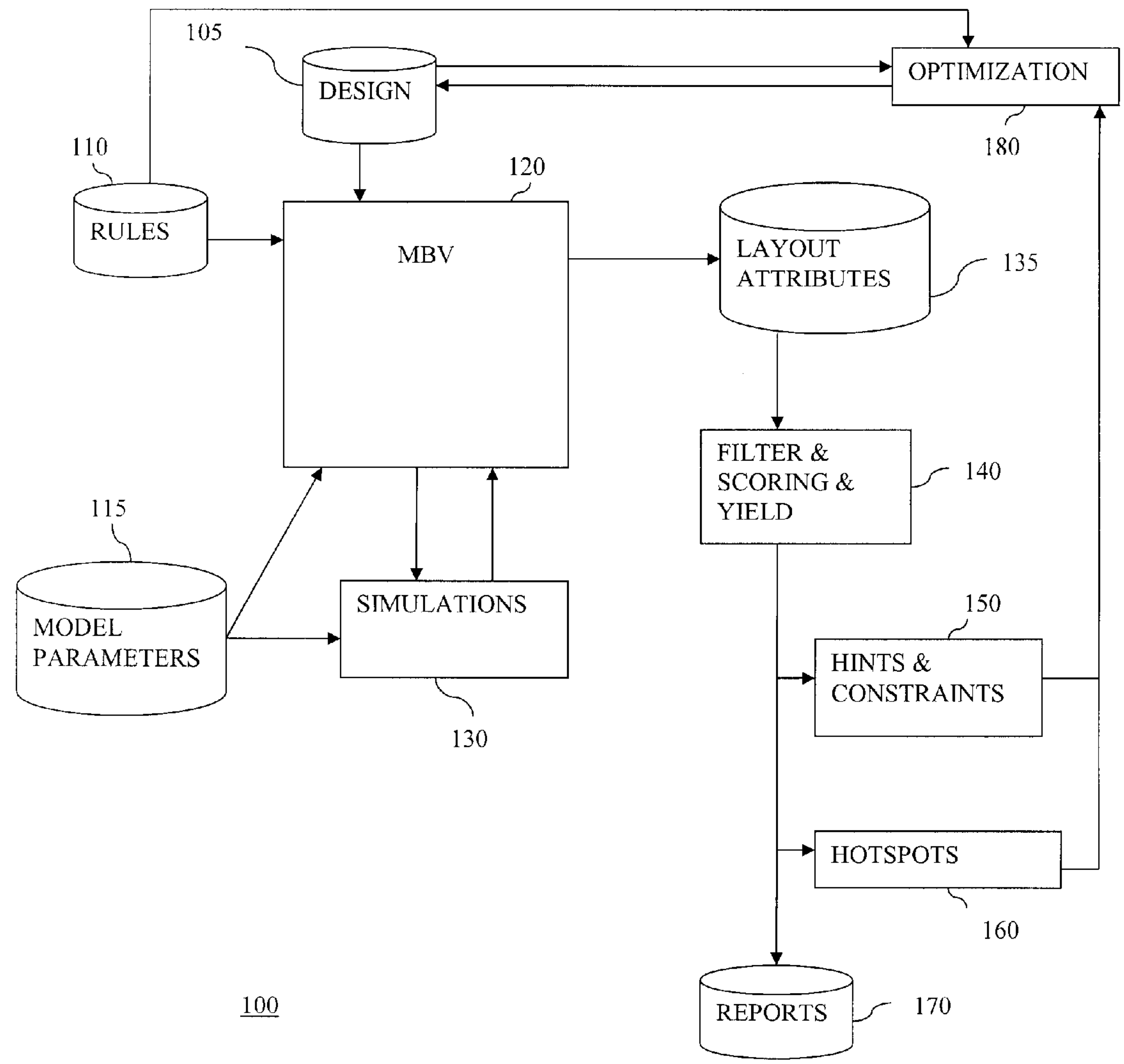
FIG. 1 depicts an architectural overview of an infrastructure for performing verification based upon both rules and models.

FIG. 1 depicts an architectural overview of an infrastructure for performing verification based upon both rules and models. The circuit design is simulated to represent the final result of the fabricated structures. The verification is performed by applying rules on the structures to better predict the hotspots. In some embodiments, Hotspots are manufacturability violations detected either with design rule check (DRC)-type rules (for example for via analysis, simplified Lithography checks via width/spacing rules, simplified chemical mechanical planarization (CMP) checks via density rules, etc.), or with simulator invocations possibly followed by DRC rules for manufacturability rule checking. For example, contours generated by a lithography simulation are checked for spacing violations. A hotspot is usually a marker/vertex, an edge, or a polygon. It will typically be stored together with information about yield loss cause, hierarchy information, and possibly information about its environment (shape patterns, connectivity information, etc).

The architectural overview 100 includes a model-based verification (MBV) tool 120 which performs model based simulations using the design 105, which includes layout of the circuits. The MBV also accept design rules 110 as input. In one embodiment, standard DRC rules are used. In another embodiment, model based rules are used. Any design rules may be used as desired by the designer. MBV also accepts the model parameters for performing the simulations 130. In one embodiment, the simulations are performed in software. In another embodiment, the simulation is performed in hardware. Any simulator may be used for simulation of the design. The simulated design represents the final manufactured result of the design on wafer. Rules 110 are used to determine possible hotspots and layout attributes 135. In some embodiments, the simulations are also provided for lithography simulations 130 to determine lithography information for fabrication.

The layout information from the layout attributes 135 is determined from the simulations and MBV. In an embodiment, the layout attributes include raw geometric violations and extraction results, such as via statistics, critical area, density information, etc. In another embodiment, layout attributes include or are related to electrical information such as net IDs.

The layout information is used to determine hotspots. Because there may be too many hotspots after simulation, a filtering, scoring and yield calculation is used to rank and determine the more critical hotspots. One implementation of the filtering, scoring and yield calculation approach is described in co-pending U.S. patent application Ser. No. 11/678,593, entitled "System and Method for Model-Based Scoring and Yield Prediction," filed on Feb. 24, 2007, which is incorporated herein by reference in its entirety.

The hotspots information is reported and is stored. In some embodiments, a report 170 is saved in storage such as in memory or hard drive. Thus, the report 170 is available to be given to the fabrication testers to assist in the determination of possible locations of hotspots on the fabricated wafers. In some embodiments, an analysis flow is usable for analyzing manufacturability on a stand-alone basis for a given process and design, for process-window optimization, and for sign-off applications. The report 170 summarizes the analysis flow results for these three applications. In other embodiments, the score and yield information 140 may also be provided as hints and constraints for optimization 180 of future designs 105. One approach to provide hints and constraints are described in co-pending U.S. patent application Ser. No. 11/678,593, entitled "System and Method for Model-Based Scoring and Yield Prediction," filed on Feb. 24, 2007, which is incorporated herein by reference in its entirety.

In further embodiments, score and yield information 140 are also used to more accurately determine hotspots, which are also used for optimization 180. One approach to implement the optimization process is described in detail in co-pending U.S. patent application Ser. No. 11/678,594, entitled "System and Method for Layout Optimization Using Model-Based Verification," filed on Feb. 24, 2007, which is incorporated herein by reference in its entirety.

Figure 2:
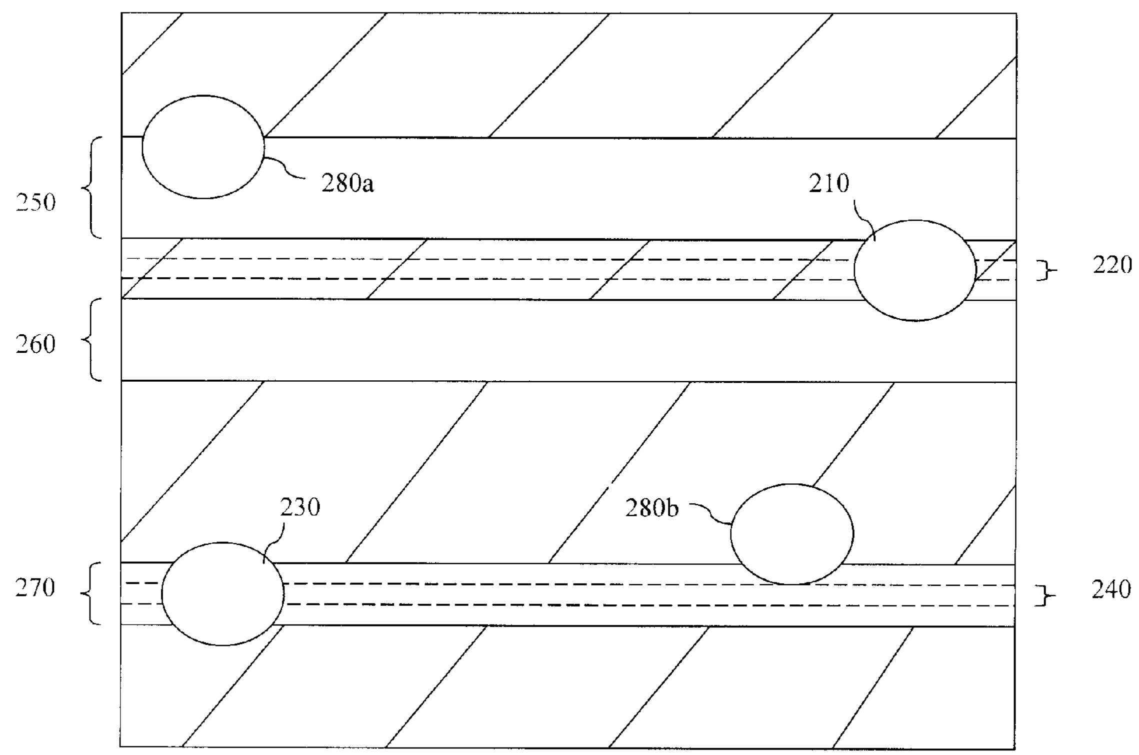
FIG. 2 illustrates the manufacturing impact and critical areas of random defects.

FIG. 2 illustrates the manufacturing impact and critical areas of random defects. In one embodiment, a section of the chip 200 includes 3 wires 250, 260, 270. The circles 280*a*, 280*b*, 210 and 230 represent defects. Some defects 280*a* and 280*b* do not affect the final product features. However, other defects 210 and 230 cause shorts and opens respectively. In one embodiment, a defect 210 connects two wires 250, 260 causing a short. In another embodiment, a defect 230 breaks a wire 270 causing an open. The critical areas for these random defects may be simulated by calculating critical areas. In one embodiment, the critical area for short is the area between the dotted lines in area 220 and area 240. Defects of a certain minimum size centered in that area are predicted to cause the shorts similar to short 210. In another embodiment, the critical area for open would be represented by the area between dotted lines 240. Defects of a certain minimum size centered in that area are predicted to cause an open 230. As shown by this example, this is one way the simulator can simulate for random defects.

The simulations also can predict by systematic modeling including modeling for CMP, lithography, etch, deposition, diffusion, etc. Thus, MBV can simulate both parametric and functional characteristics and then yield.

Figure 3:
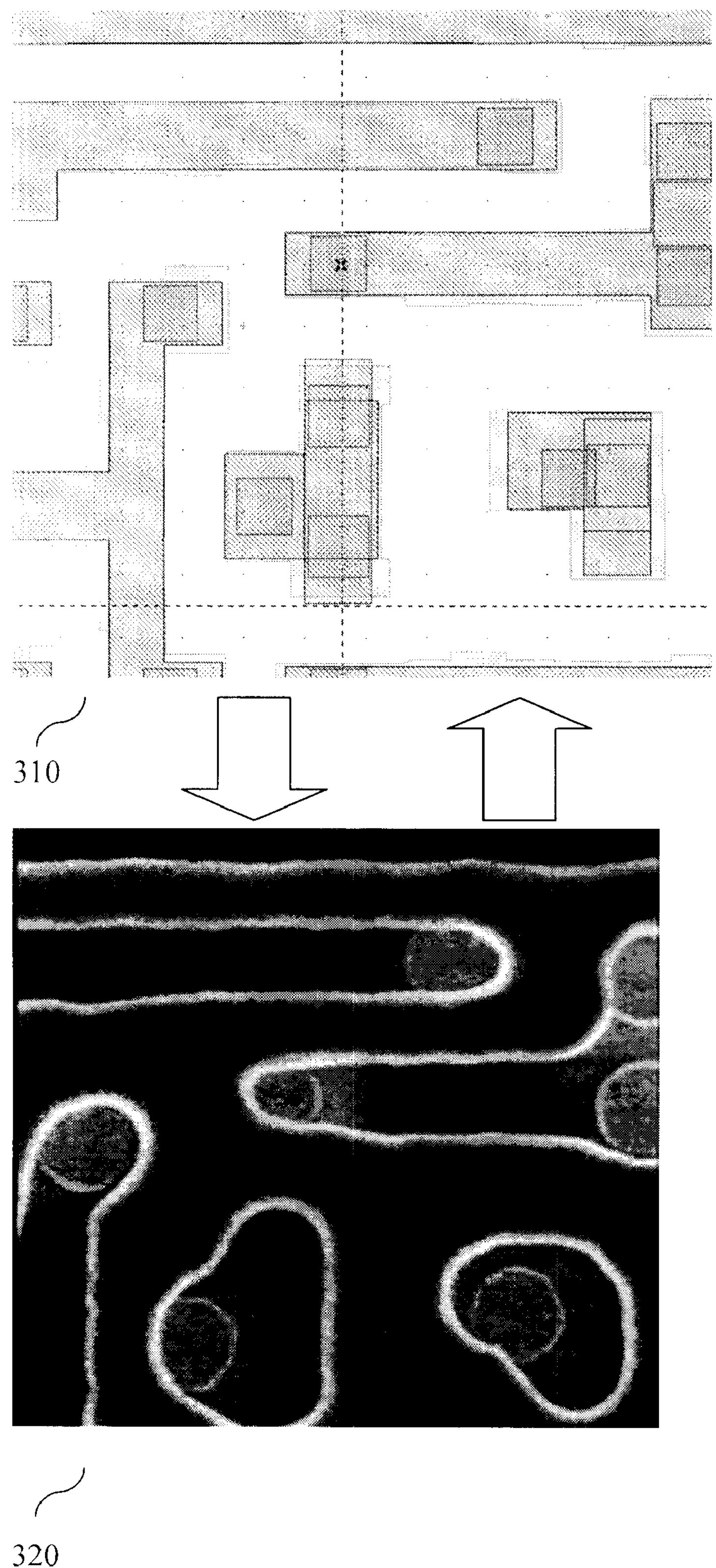
FIG. 3 illustrates model based simulation.

FIG. 3 illustrates model based simulation. The simulation 300 provides a better representation of the design for improved verification of the system. For example, a circuit design 310 even with corrections such as Optical and Process Correction (OPC) will not result in the layout as designed after manufacture. Information such as manufacturing information and design intent rules are used by MBV to predict and simulate the final product features after fabrication. The simulator calculates the as manufactured product features using information of the fab process and the interaction of the materials to determine the most likely model 320 for analysis.

Figure 4A:
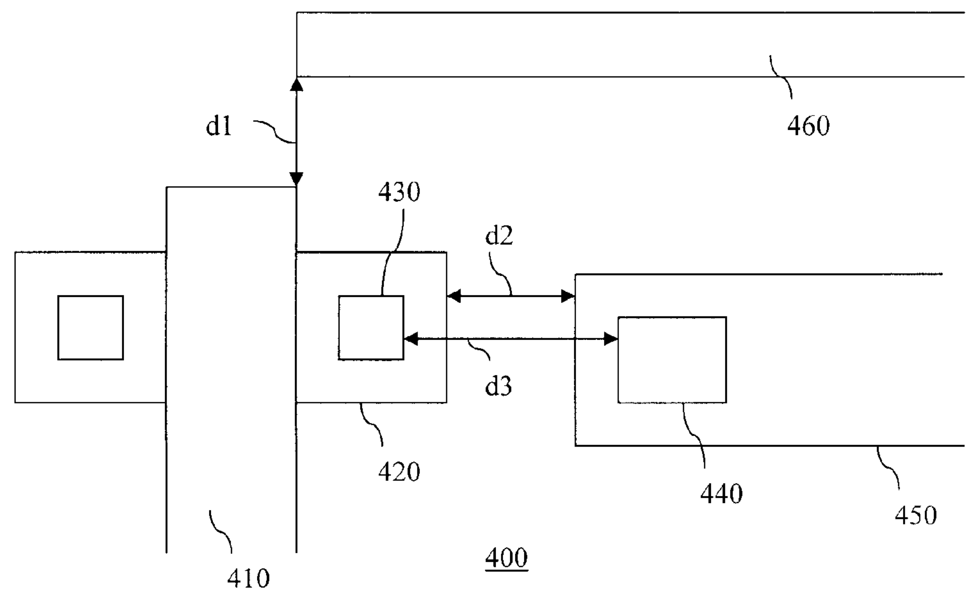
FIG. 4A illustrates design rule based analysis.

FIG. 4A illustrates design rule based analysis. In traditional rule-based approaches for the exemplary layout 400, rectangles 410 and 460, 420 and 450, as well as 430 and 440 represents features on a chip. The layout 400 needs to follow a set of design rules, which defines the distances d1, d2 and d3 the features 410 and 460, 420 and 450, as well as 430 and 440 need to be apart, respectively. Because the final fabricated features have distances that are not the distances represented by the design, the distances defined in the rules have to include additional buffer distances to anticipate the possible differences between the final product and the original design to guarantee a certain yield. The distances d1, d2 and d3 are provided by the design rules including a buffer distance to ensure the final as manufactured features avoid critical area violations. Generally, the greater the distance, the higher the final yield. Therefore, the layout is not the most efficient use of layout space.

Figure 4B:
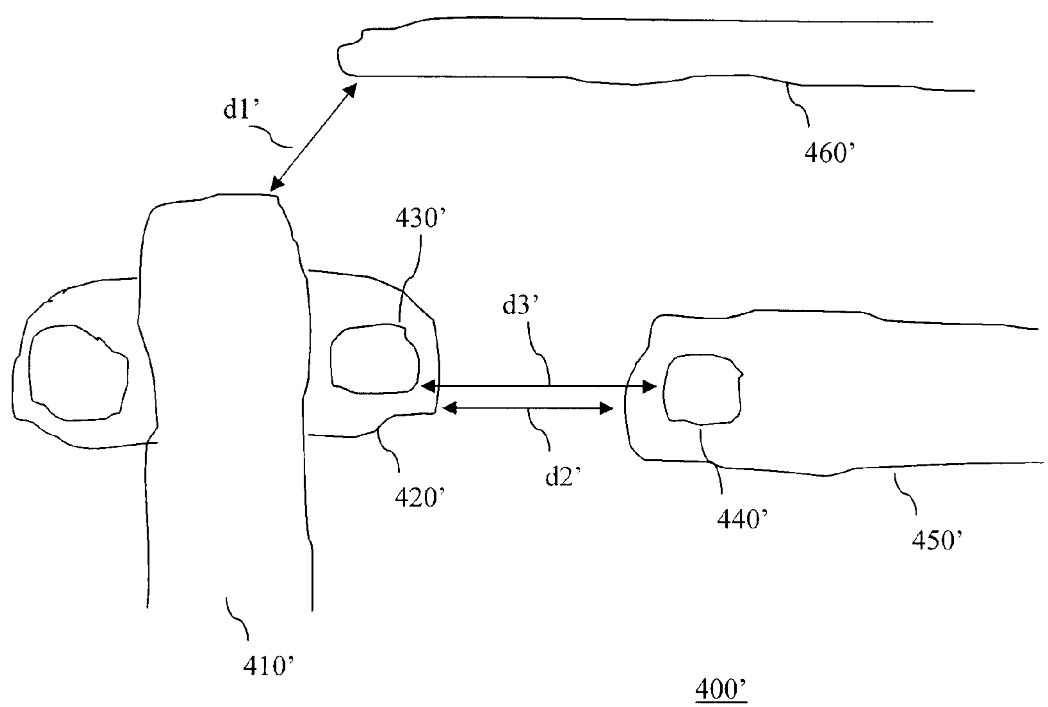
FIG. 4B illustrates model-based analysis.

FIG. 4B illustrates model-based analysis such as at MBV. Using model-based approach, the design layout 400 is simulated with models and design for manufacturing (DFM) information to produce to layout 400', which includes a more accurate representation of the as-manufactured product features. The final features are illustratively shown to be the shapes as represented by the layout 400' with shapes 410' and 460', 420' and 450', as well as 430' and 440' needing to be a distance d1', d2' and d3' apart, respectively. The distances d1', d2' and d3' are provided by any desired rules but can include a smaller buffer distance than the tradition distances because the simulated final product features are more accurately represented than traditional simulations. Therefore, the layout used for fabrication is a more efficient use of layout space.

Figure 5:
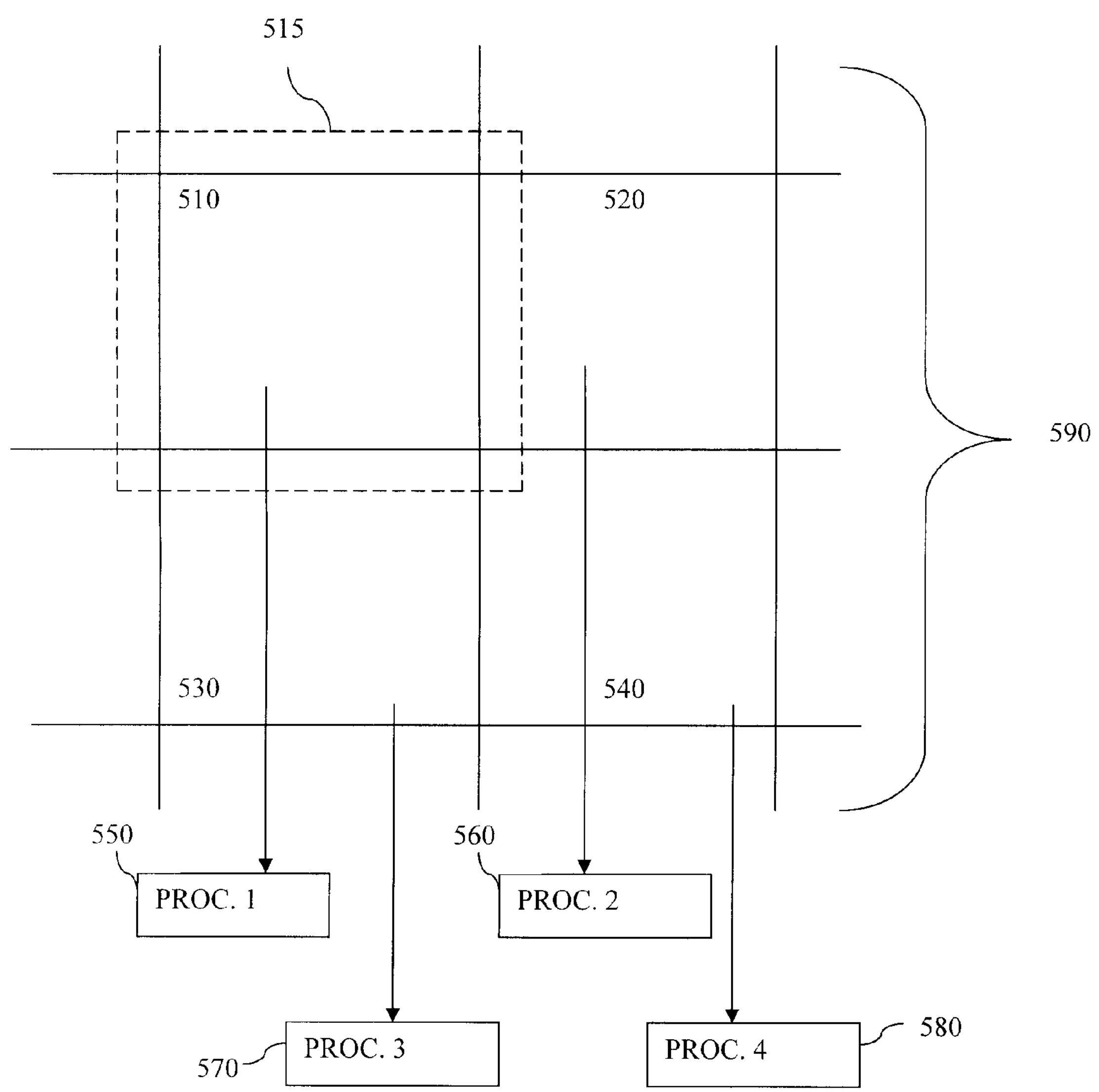
FIG. 5 illustrates distributed processing

FIG. 5 illustrates distributed processing 500. A model based simulated chip design 590 is divided into sections for distributed processing. The sections are divided up in accordance by function, criticality or any other desired reasons. In one embodiment, the chip design 590 includes sections 510, 520, 530 and 540. In another embodiment, each section may simulated by a different processor. For example, sections 510, 520, 530 and 540 are processed by processors 1, 2, 3 and 4, 550, 560, 570 and 580 respectively. In a further embodiment, each section includes a halo 515 when being simulated. The halo 515 gives additional information about the components in the immediate areas around the section being simulated. The halo 515 increases the accuracy of the model-based simulation to improve the prediction of the features of the final fabricated components. For example, section 510 includes information within halo 515 when processor 1 550 performs simulation for the design. One approach for implementing the parallel processing is described in co-pending U.S. patent application Ser. No. 11/225,853, entitled "Method and System for Implementing Parallelizing Processing of Electronic Design Automation Tools," filed on Sep. 12, 2005, which is incorporated herein by reference in its entirety. Another approach for implementing the parallel processing is described in co-pending U.S. patent application Ser. No. 11/225,815, entitled "Method and System for Parallelizing Computing Operations," filed on Sep. 12, 2005, which is incorporated herein by reference in its entirety.

Figure 6:
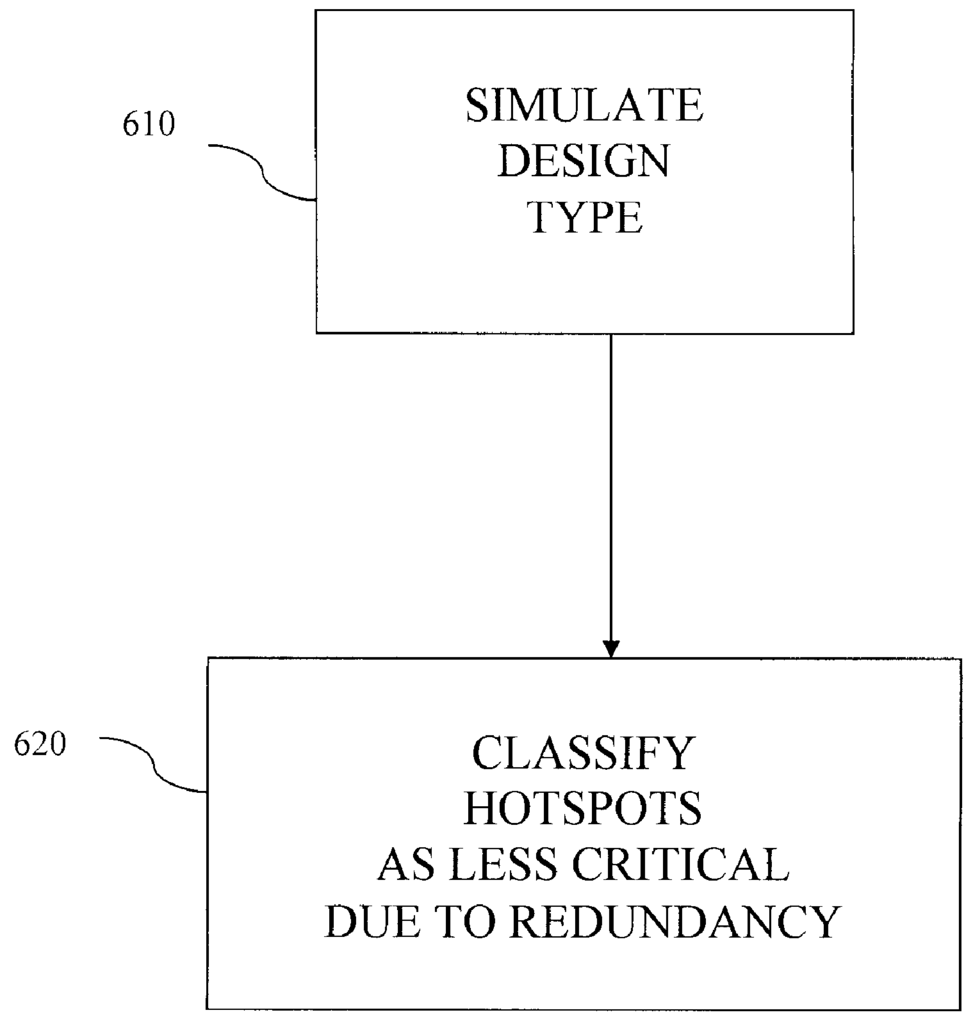
FIG. 6 depicts the flow diagram for customization of certain design types.

FIG. 6 depicts the flow diagram for customization of certain design types. The flow diagram 600 allows the model-based analysis to improve predicting critical areas when classifying hotspots. MBV tool simulates the design type 610. After the design is simulated, hotspots are classified by how much they affect the production yield 620. For areas that allows for more redundancy, more hotspots are acceptable in those areas because they will not affect the final yield of the product as much as if the hotspots were located in more sensitive areas. For example, a block of design may be for a memory. Memory is designed with redundancy; therefore, hotspots for the memory layout design affect the final yield less than the hot spots in other portions of the design.

Figure 7:
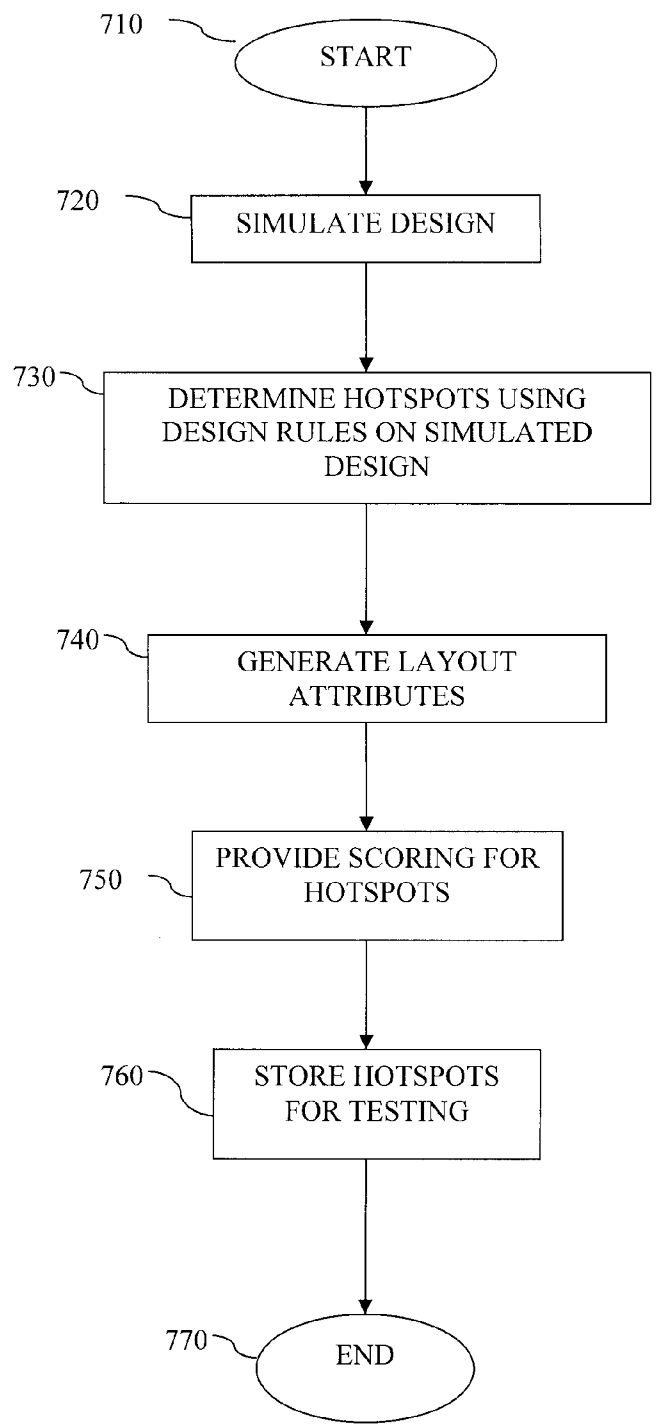
FIG. 7 depicts the flow diagram for model based analysis.

FIG. 7 depicts the flow diagram for model-based analysis.

At 710, the flow 700 starts by providing rules, models and design information to the MBV.

At 720, MBV performs simulation of the design. The simulation provides the predicted shapes of the design on the fabricated wafer. The shapes are predicted using information from the fabs. The design rules are determined based on the information provided by the fabs to improve the production yield of the wafer.

At 730, using the design rules with the simulated design, hotspots on the design layout are predicted for the final product features. The hotspots are designed for areas that violate certain design rules. In one embodiment, an area violates design rules when a distance between the features in the area is less than the distance required by the rules. In another embodiment, an area is determined to be a hotspot if is determined by design rules provided by the manufacturer. The hotspots are ranked and the layout design within the hotspots is adjusted to generate layout attributes to try to improve the yield.

At 740, layout attributes are generated from the MBV tool. In some embodiments, the layout attributes include raw geometric violations and other simulation and extraction results, such as via statistics, critical area, density information, etc. In other embodiments, layout attributes include or are related to electrical information such as net IDs.

At 750, the hotspots are filtered to provide scoring for the hotspots. One approach for implementing the filtering and scoring is described in co-pending U.S. patent application Ser. No. 11/678,593, entitled "System and Method for Model-Based Scoring and Yield Prediction," filed on Feb. 24, 2007, which is incorporated herein by reference in its entirety.

At 760, the determined hotspots are stored and provided for testers at the fab for final testing. In an embodiment, these hotspots are stored and reported. In another embodiment, the hotspots are provided to the manufacturers to represent design intent. This information assists and increases the efficiency of determining actual hotspots and testing of the manufactured wafer.

At 770, the flow 700 ends.

Figure 8:
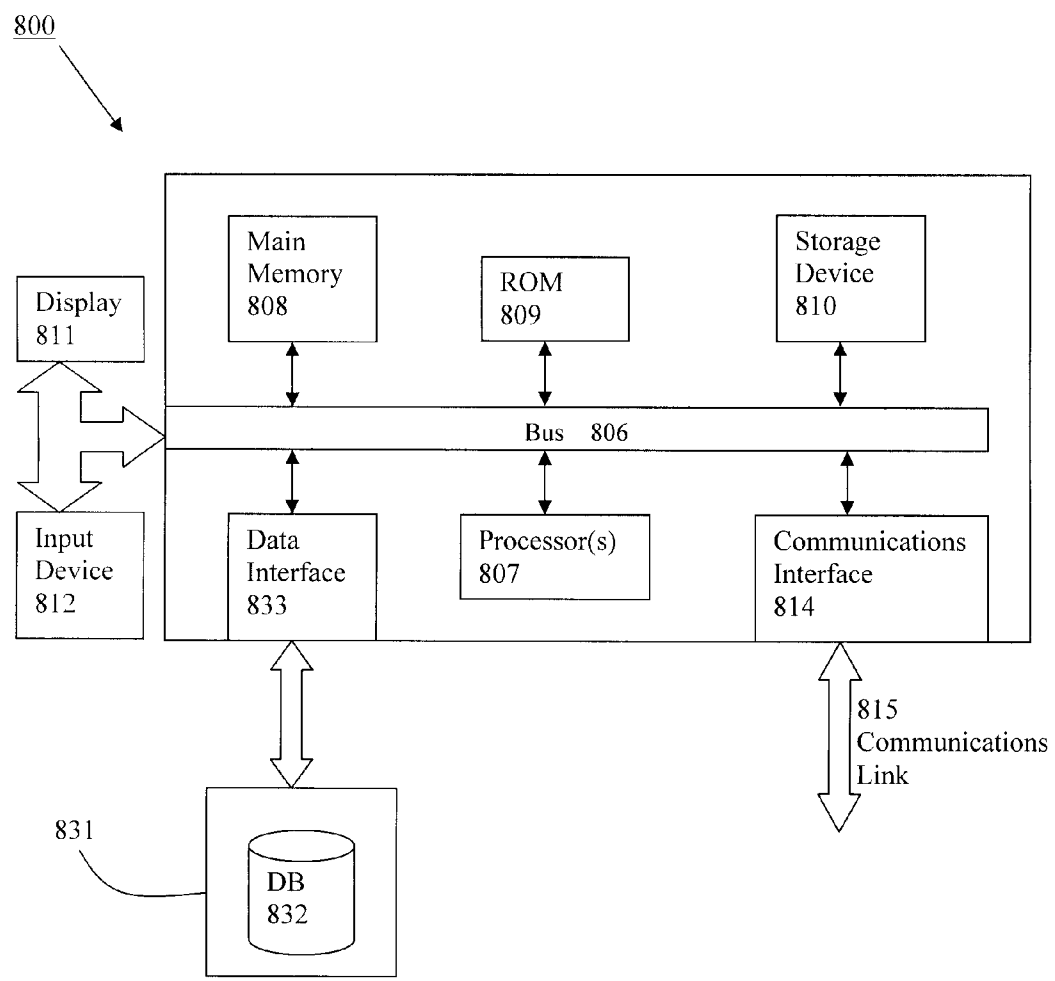
FIG. 8 depicts a computerized system on which a method for verification based on rules and models can be implemented.

FIG. 8 depicts a computerized system on which a method for verification based on rules and models can be implemented. The execution of the sequences of instructions required to practice the embodiments may be performed by a computer system 800 as shown in FIG. 8. In an embodiment, execution of the sequences of instructions is performed by a single computer system 800. According to other embodiments, two or more computer systems 800 coupled by a communication link 815 may perform the sequence of instructions in coordination with one another. Although a description of only one computer system 800 will be presented below, however, it should be understood that any number of computer systems 800 may be employed to practice the embodiments.

A computer system 800 according to an embodiment will now be described with reference to FIG. 8, which is a block diagram of the functional components of a computer system 800. As used herein, the term computer system 800 is broadly used to describe any computing device that can store and independently run one or more programs.

Each computer system 800 may include a communication interface 814 coupled to the bus 806. The communication interface 814 provides two-way communication between computer systems 800. The communication interface 814 of a respective computer system 800 transmits and receives electrical, electromagnetic or optical signals, which include data streams representing various types of signal information, e.g., instructions, messages and data. A communication link 815 links one computer system 800 with another computer system 800. For example, the communication link 815 may be a LAN, in which case the communication interface 814 may be a LAN card, or the communication link 815 may be a PSTN, in which case the communication interface 814 may be an integrated services digital network (ISDN) card or a modem, or the communication link 815 may be the Internet, in which case the communication interface 814 may be a dial-up, cable or wireless modem.

A computer system 800 may transmit and receive messages, data, and instructions, including program, i.e., application, code, through its respective communication link 815 and communication interface 814. Received program code may be executed by the respective processor(s) 807 as it is received, and/or stored in the storage device 810, or other associated non-volatile media, for later execution.

In an embodiment, the computer system 800 operates in conjunction with a data storage system 831, e.g., a data storage system 831 that contain a database 832 that is readily accessible by the computer system 800. The computer system 800 communicates with the data storage system 831 through a data interface 833. A data interface 833, which is coupled to the bus 806, transmits and receives electrical, electromagnetic or optical signals, which include data streams representing various types of signal information, e.g., instructions, messages and data. In embodiments, the functions of the data interface 833 may be performed by the communication interface 814.

Computer system 800 includes a bus 806 or other communication mechanism for communicating instructions, messages and data, collectively, information, and one or more processors 807 coupled with the bus 806 for processing information. Computer system 800 also includes a main memory 808, such as a random access memory (RAM) or other dynamic storage device, coupled to the bus 806 for storing dynamic data and instructions to be executed by the processor (s) 807. The main memory 808 also may be used for storing temporary data, i.e., variables, or other intermediate information during execution of instructions by the processor(s) 807.

The computer system 800 may further include a read only memory (ROM) 809 or other static storage device coupled to the bus 806 for storing static data and instructions for the processor(s) 807. A storage device 810, such as a magnetic disk or optical disk, may also be provided and coupled to the bus 806 for storing data and instructions for the processor(s) 807.

A computer system 800 may be coupled via the bus 406 to a display device 811, such as, but not limited to, a cathode ray tube (CRT), for displaying information to a user. An input device 812, e.g., alphanumeric and other keys, is coupled to the bus 806 for communicating information and command selections to the processor(s) 807.

According to one embodiment, an individual computer system 800 performs specific operations by their respective processor(s) 807 executing one or more sequences of one or more instructions contained in the main memory 808. Such instructions may be read into the main memory 408 from another computer-usable medium, such as the ROM 809 or the storage device 810. Execution of the sequences of instructions contained in the main memory 808 causes the processor (s) 807 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 807. Such a medium may take many forms, including, but not limited to, non-volatile, volatile and transmission media. Non-volatile media, i.e., media that can retain information in the absence of power, includes the ROM 809, CD ROM, magnetic tape, and magnetic discs. Volatile media, i.e., media that can not retain information in the absence of power, includes the main memory 808. Transmission media includes coaxial cables, copper wire and fiber optics, including the wires that comprise the bus 806. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than in a restrictive sense.

What is claimed is:

1. A computer-implemented method for performing verification comprising:

predicting the physical realization of a layout design based at least in part upon model parameters;

analyzing the predicted layout design using model-based design rules, wherein the model-based design rules are associated with a model-based buffer distance smaller than a design rule check (DRC) buffer distance used with a DRC rule;

determining areas of violation based at least in part upon the analyzed layout design, wherein the act of determining areas of violation comprises using a processor; and storing the areas in a volatile or non-volatile computer-usable medium or displaying the areas on a display device.

2. The method of claim 1, wherein the physical realization is predicted by systematic modeling comprising parametric and functional characteristics and yield.

3. The method of claim 2, further comprising calculating as-manufactured-product features utilizing information of the fabrication process and interaction of the materials.

4. The method of claim 3, wherein the information comprises manufacturing information and design intent rules.

5. The method of claim 1, wherein the layout design is divided into sections for distributed processing.

6. The method of claim 1, wherein predicting the physical realization comprises customization of certain design types.

7. The method of claim 1, wherein predicting the physical realization comprises simulating using models and design for manufacturing (DFM) information.

8. The method of claim 1, wherein the layout space used for the predicted layout design has a more compact design layout due to the smaller model-based buffer distance for a desired manufactured yield than if the layout space uses DRC rules having the desired manufactured yield.

9. A system for performing verification comprising:

means for predicting a physical realization of a layout design based at least in part upon model parameters;

means for analyzing the predicted layout design model-based design rules, wherein the model-based design rules are associated with a model-based buffer distance smaller than a design rule check (DRC) buffer distance used with a DRC rule;

a processor for determining areas of violation based at least in part upon the analyzed layout design; and a volatile or non-volatile computer-usable medium for storing the areas or a display device for displaying the areas.

10. The system of claim 9, wherein the physical realization is predicted by systematic modeling comprising parametric and functional characteristics and yield.

11. The system of claim 10, further comprising means for calculating as-manufactured-product features utilizing information of the fabrication process and interaction of the materials.

12. The system of claim 11, wherein the information comprises manufacturing information and design intent rules.

13. The system of claim 9, wherein the layout design is divided into sections for distributed processing.

14. The system of claim 9, wherein means for predicting the physical realization comprises customization of certain design types.

15. The system of claim 9, wherein means for predicting the physical realization comprises simulating using models and design for manufacturing (DFM) information.

16. The system of claim 9, wherein the layout space used for the predicted layout design has a more compact design layout due to the smaller model-based buffer distance for a desired manufactured yield than if the layout space uses DRC rules having the desired manufactured yield.

17. A computer program product embodied in a volatile or non-volatile computer-usable medium, storing executable code to execute a process for performing verification, the process comprising:

predicting the physical realization of a layout design based at least in part upon model parameters;

analyzing the predicted layout design using model-based design rules, wherein the model-based design rules are associated with a model-based buffer distance smaller than a design rule check (DRC) buffer distance used with a DRC rule; and determining areas of violation based at least in part upon the analyzed layout design; and storing the areas or displaying the areas on a display device.

18. The product of claim 17, wherein the physical realization is predicted by systematic modeling comprising parametric and functional characteristics and yield.

19. The product of claim 18, further comprising calculating as-manufactured-product features utilizing information of the fabrication process and interaction of the materials.

20. The product of claim 19, wherein the information comprises manufacturing information and design intent rules.

21. The product of claim 17, wherein the layout design is divided into sections for distributed processing.

22. The product of claim 17, wherein predicting the physical realization comprises simulating using models and design for manufacturing (DFM) information.

23. The product of claim 17, wherein the layout space used for the predicted layout design has a more compact design layout due to the smaller model-based buffer distance for a desired manufactured yield than if the layout space uses DRC rules having the desired manufactured yield.

* * * * *